Patented Aug. 18, 1931

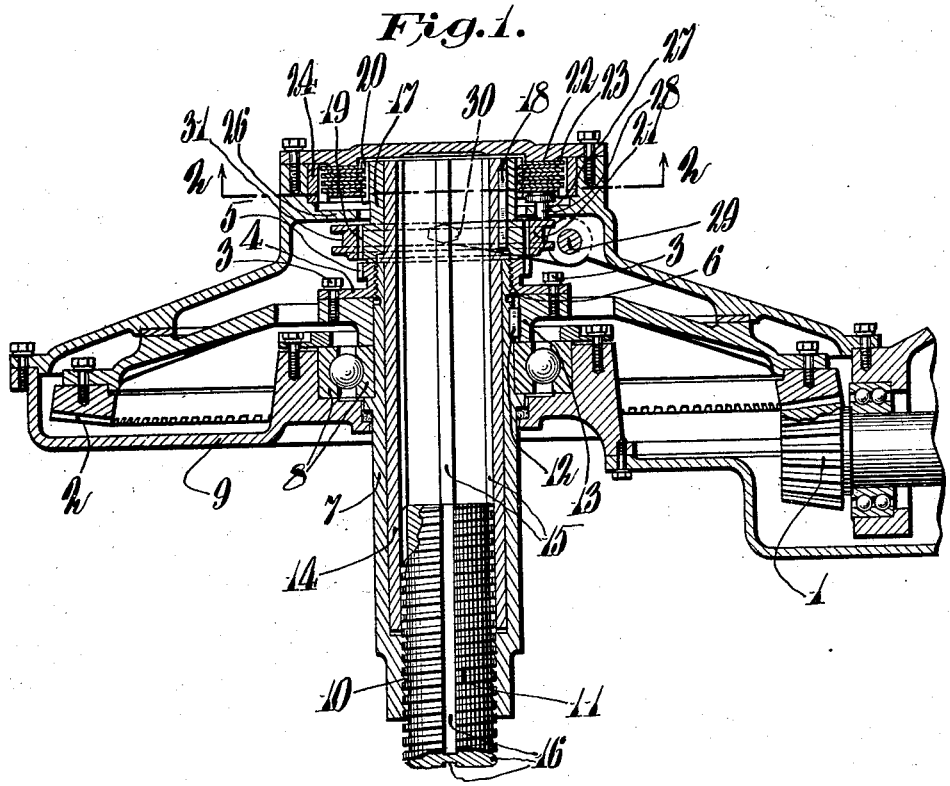

1,819,697

UNITED STATES PATENT OFFICE

CORNELIUS G. BOUDETTE, OF CLAREMONT, NEW HAMPSHIRE, ASSIGNOR TO SULLIVAN MACHINERY COMPANY, A CORPORATION OF MASSACHUSETTS

POWER TRANSMISSION AND ADJUSTING MECHANISM

Application filed February 21, 1924. Serial No. 694,222.

My invention relates to power transmission and adjusting mechanisms.

An object of my invention is to provide an improved power transmission and adjusting mechanism. Another object of my invention is to provide an improved power transmission and adjusting mechanism of a type wherein automatic means is provided to limit the adjusting movement and to prevent breakage or jamming of parts. Other objects and advantages of my invention will hereinafter more fully appear.

In the accompanying drawings I have shown for purposes of illustration one form which my invention may assume in practice.

In these drawings,—

Fig. 1 is a central vertical section through a mechanism in which the illustrative form of my invention is embodied.

Fig. 2 is a horizontal section on a plane corresponding to the line 2—2 of Fig. 1.

The illustrative embodiment of my invention is shown as applied to a power transmission and adjusting mechanism of a type which is employed for changing the plane of operation of the cutting mechanism of a mining machine and transmitting power to operate the same in different planes of adjustment.

It will be observed that a power driven bevel pinion 1 rotates a bevel gear 2 to which there is secured by a series of machine screws 3 a member 4 which is provided with a plurality of radially extending teeth or ribs 5. This member 4 is threaded as at 6 to a sleeve member 7 which is journaled in a bearing 8 in a head member 9 and which at its lower end provides a threaded portion 10 whose thread engages a vertically disposed screw 11. This member 11 constitutes a driving and power transmitting element and transmits its drive in different longitudinal positions. It will be noted that the member 7 is keyed at 12 to the hub portion 13 of the gear 2 so that the parts are prevented from relative rotation while longitudinal relative movement is prevented by the threaded connection between the members 4 and 7 and the connection by the machine screws 3 of the member 4 to the member 2. Between the threaded member 11 and the internal periphery of the major portion of the member 7 there is arranged a sleeve 14 which is provided with inwardly directed splines 15 which engage in longitudinally extending slots 16 in the member 11. The member 14 at its upper end carries a sleeve-like member 17 which is keyed as at 18 to the member 14 so as to prevent their relative rotation and which is provided with two coaxial sets of ribs or teeth 19 and 20. The teeth 19 are constantly in engagement with grooves in the internal periphery of an annular clutch member 21 whose grooves on downward movement of the clutch member are adapted also to slide over the teeth 5 upon the member 4 so as to connect the members 17 and 4 to each other in non-rotative relation, this resulting in the connection in non-rotative relation of the members 14 and 7. The teeth 20 engage the alternate discs of a friction clutch mechanism 22, certain discs 23 of which are engaged by and held against rotation by connection to a member 24 secured to the housing 9. Between the friction clutch 22 and the clutch sleeve 21 there projects inwardly from the frame 9 an annular flange 26 through which flange there extends a series of holes 27 in which plungers 28 are slidably mounted, these plungers being adapted on upward movement of the sleeve 21 to be forced into engagement with the friction clutch 22 and to cause the latter to hold the member 17 against rotation. Secured to a shaft 29 is a clutch shipper 30 which has arms engaging with a groove 31 in the sleeve 21 and the arms 30 may be caused to raise or lower the sleeve 21 by rotation of the shaft 29.

It will be understood that my improvement while shown applied to a mining machine mechanism is not by any means necessarily limited in its application to such devices, but that it may be applied in any place where it is desired to secure selective longitudinal movement of and power transmission by a shaft or other member and wherein it is desired to prevent automatic movement of the member to a position in which breakage would be likely to occur due to jamming of the parts.

The mode of operation of this mechanism will be readily apparent. Assume that the pinion 1 is driving the gear 2 and that as a result the member 7 together with its nut 10 are being rotated. With the clutch sleeve 21 in the position shown it will be noted that the discs of the friction clutch 22 are being pressed into engagement with each other in such manner as to prevent rotation of the member 17 and so of the member 14. Accordingly, the member 11 will be prevented from rotation by engagement in its grooves 16 of the splines 15 upon the inner periphery of the member 14 and as the screw cannot rotate while the nut is rotating, the screw will be moved longitudinally without rotation. When the clutch sleeve 21 is moved downward to connect the members 4 and 17, it will be noted that the nut will then be connected in non-rotative relation to the screw and that the parts will rotate without longitudinal movement of the member 11 but the latter will transmit rotation at the same angular rate as the rotation of the gear 2, the friction clutch 22 of course not holding at this time. Excessive downward movement with a mechanism of the type disclosed herein is prevented by engagement of the mechanism carried at the lower end of the member 11 with the surface over which the mechanism as a whole is moved or by means for stopping its downward movement in any other way. If it be assumed that the parts are rotated in such direction as to cause upward movement of the member 11 when it reaches a position in which its upper end will engage the top of the frame member 9, it will be observed that the friction clutch 22 will slip and will prevent damage being done, since the only thing preventing rotation of the screw is the frictional engagement of the discs of the friction clutch. It will be equally apparent that when the maximum downward movement possible has taken place, the parts will not become broken or jammed because the friction discs will similarly slip when the relative downward movement is no longer possible and the nut and screw will rotate at equal angular rates, which as explained above, results in a cessation of longitudinal movement of the screw.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a screw, a nut threadedly engaged therewith, means for rotating one of the same, means releasable at will for positively connecting the other thereto for rotation therewith at an equal angular rate, and means operative when said second mentioned means is released for frictionally holding said other against rotation to effect relative movement between said screw and nut.

2. In combination, a screw, a nut threadedly engaged therewith, means for rotating one of the same, friction means for holding the other of the same stationary to effect relative movement between said screw and nut, and means releasable at will for positively connecting said nut and screw for rotation together at equal angular rates and operative to control said frictional holding means.

3. In combination, a screw, means having splined engagement therewith relative to which said screw is longitudinally movable, a nut threadedly engageable with said screw and rotatable relative to said first mentioned means, means for connecting said first mentioned means and nut for rotation at equal angular rates, means for rotating said nut, and frictional means for preventing the rotation of said means splined to said screw.

4. In combination, a screw, means having splined engagement therewith relative to which said screw is longitudinally movable, a nut threadedly engageable with said screw and rotatable relative to said first mentioned means, means for connecting said first mentioned means and nut for rotation at equal angular rates including a clutch coaxial with said screw, means for rotating said nut, and frictional means for preventing the rotation of said means splined to said screw.

5. In combination, a screw, means having splined engagement therewith relative to which said screw is longitudinally movable, a nut threadedly engageable with said screw and rotatable relative to said first mentioned means, means including a clutch for connecting said first mentioned means and nut for rotation at equal angular rates, means for rotating said nut, and frictional means for preventing rotation of the means splined to said screw including a friction clutch actuated by said first mentioned clutch.

6. In a mining machine, an adjusting and power transmission mechanism including a pair of members cooperating on relative movement to effect adjustment of the part adjustable thereby and cooperating to transmit rotation to the said part on like movement of said members, one of said members driving the other member which in turn drives the said part, means associated with said members for automatically terminating relative movement and causing simultaneous movement thereof when a predetermined relation of said members is reached whereby movement of the adjustable part is terminated, and means for positively effecting simultaneous movement of said members at will.

7. An adjusting and driving mechanism including a plurality of members cooperating on relative movement to effect adjusting movement of one of said members bodily relative to the other and said members cooperating on simultaneous movement to effect driving by said other member of said adjustable member in any of its adjusted positions and without occurrence of said adjusting movement, means associated with said members for terminating automatically relative movement and causing simultaneous movement thereof when a predetermined relation of said members is reached whereby adjusting movement of said adjustable member is terminated, and means operable at will for causing simultaneous movement of said members.

8. An adjusting and driving mechanism including a plurality of members cooperating on relative rotative movement to effect adjusting movement of one of said members bodily relative to the other and said members cooperating on simultaneous movement to effect rotation by said other member of said adjustable member in any of its adjusted positions and without occurrence of said adjusting movement, means associated with said members for terminating automatically relative movement and causing simultaneous movement thereof when a predetermined relation of said members is reached whereby adjusting movement of the adjustable member is terminated, and means operable at will for causing simultaneous movement of said members.

9. An adjusting and driving mechanism including a plurality of members cooperating on relative movement to effect adjusting movement of one of said members bodily relative to the other and said members cooperating on simultaneous movement to effect driving by said other member of said adjustable member in any of its adjusted positions and without occurrence of said adjusting movement, friction means associated with said members for terminating automatically relative movement and causing simultaneous movement thereof when a predetermined relation of said members is reached whereby adjusting movement of said adjustable member is terminated, and means operable at will for causing simultaneous movement of said members.

10. An adjusting and driving mechanism including a plurality of coaxial members cooperating on relative rotative movement to effect adjusting movement of one of said coaxial members bodily relative to the other member and said members cooperating on simultaneous movement to effect rotation of said adjustable member in any of its adjusted positions and without occurrence of said adjusting movement by said other member, means associated with said members for automatically terminating relative movement and causing simultaneous movement thereof when a predetermined relation of said members is reached whereby adjusting movement of the adjustable member is terminated, and means operable at will for causing simultaneous movement of said members.

11. An adjusting and driving mechanism including a plurality of members cooperating on relative movement to effect non-rotative adjusting movement of one of said members bodily relative to the other and said members cooperating on simultaneous movement to effect driving by said other member of said adjustable member in any of its adjusted positions and without occurrence of said adjusting movement, means associated with said members for terminating automatically relative movement and causing simultaneous movement thereof when a predetermined relation of said members is reached whereby adjusting movement of said adjustable member is terminated, and means operable at will for causing simultaneous movement of said members.

12. An adjusting and driving mechanism including a plurality of members cooperating on relative rotative movement to effect non-rotative adjusting movement of one of said members bodily relative to the other and said members cooperating on simultaneous movement to effect rotation by said other member of said adjustable member in any of its adjusted positions and without occurrence of said adjusting movement, means associated with said members for terminating automatically relative movement and causing simultaneous movement thereof when a predetermined relation of said members is reached whereby adjusting movement of the adjustable member is terminated, and means operable at will for causing simultaneous movement of said members.

13. An adjusting and driving mechanism including a plurality of members cooperating on relative movement to effect non-rotative adjusting movement of one of said members bodily relative to the other and said members cooperating on simultaneous movement to effect driving by said other member of said adjustable member in any of its adjusted positions and without occurrence of said adjusting movement, friction means associated with said members for terminating automatically relative movement and causing simultaneous movement thereof when a predetermined relation of said members is reached whereby adjusting movement of said adjustable member is terminated, and means operable at will for causing simultaneous movement of said members.

14. An adjusting and driving mechanism including a plurality of coaxial members cooperating on relative rotative movement to effect non-rotative adjusting movement of one of said coaxial members bodily relative to the other member and said members cooperating on simultaneous movement to effect rotation by said other member of said adjustable member in any of its adjusted positions and without occurrence of said adjusting movement, means associated with said members for automatically terminating relative movement and causing simultaneous movement thereof when a predetermined relation of said members is reached whereby adjusting movement of the adjustable member is terminated, and means operable at will for causing simultaneous movement of said members.

15. In combination, a screw element, a nut element threadedly connected therewith, means for rotating one of said elements, means releasable at will for connecting the other element to said rotating element for rotation therewith, said elements when connected being positively driven together at an equal angular rate, and means operative when said connected element is disconnected by said releasable means from said rotating element for yieldably holding said connected element against rotation to effect relative movement between said screw and nut elements.

16. An adjusting and driving mechanism including members having rotative movement and relative axial movement, means for positively rotating one of said members, means for holding one of said members against rotation to effect axial adjusting movement of the other member bodily relative thereto, means for connecting said members together for simultaneous rotation to cause said positively rotated member to rotate said adjustable member whereby the adjustable member may constitute a driving member, and means associated with said members for automatically terminating the axial movement of said adjustable member relative to said positively rotated member and causing said axially adjustable member to rotate with said other member when a predetermined relation of said members is reached.

17. An adjusting and driving mechanism including a plurality of members having rotative movement and relative axial movement, said members cooperating on rotative movement of one member to effect non-rotative axial adjusting movement of the other member bodily relative thereto and said members cooperating on simultaneous rotative movement to effect driving of said adjustable member by said other member, and means associated with said members for automatically terminating axial movement of said adjustable member relative to said other member and causing said members to simultaneously rotate when a predetermined relation of said members is reached.

18. An adjusting and driving mechanism including a threaded shaft element and a nut element threadedly connected therewith, said elements having rotative movement and relative axial movement and cooperating on relative rotative movement to effect non-rotative adjusting movement of one of said elements bodily axially relative to the other element and cooperating on simultaneous rotative movement to effect rotation of said adjustable element without said axial movement, and means associated with said threaded shaft and nut elements for automatically terminating relative axial movement between said elements and causing simultaneous rotative movement of said elements when a predetermined relation of said elements is reached whereby axial movement of said adjustable element is terminated.

19. An adjusting and driving mechanism including a cooperating screw and nut having rotative movement and relative axial movement, means for positively rotating said nut, means for holding said screw against rotation to effect axial adjusting movement of said screw bodily relative to said nut, means for connecting said screw and nut together for simultaneous rotation to cause said nut to rotate said screw whereby the screw constitutes a driving member, and means associated with said screw and nut for automatically terminating axial movement of said screw relative to said nut and causing said screw to rotate with said nut when a predetermined relation of said screw and nut is reached.

20. An adjusting and driving mechanism including a cooperating screw and nut having rotative movement and relative axial movement, means for positively rotating said nut, means for holding said screw against rotation to effect axial non-rotative adjusting movement of said screw bodily relative to said nut, means for connecting said screw and nut together for simultaneous rotation to cause said nut to rotate said screw whereby the screw constitutes only a rotatable driving member and has no axial movement and means associated with said screw and nut for automatically terminating axial movement of said screw relative to said nut and causing said screw to rotate with said nut when a predetermined relation of said screw and nut is reached.

21. An adjusting and driving mechanism for adjusting and driving an element including a plurality of members having rotative driving movement and relative adjusting movement, said members cooperating on relative movement to effect adjusting movement of one member relative to the other to adjust the position of the element without driving the latter and said members cooperating on simultaneous driving movement to transmit power to said adjustable member to effect driving of the element without said adjusting movement, means associated with said members for terminating automatically relative movement between said members and to cause simultaneous movement of said members when a predetermined relation of said members is reached whereby adjusting movement of said adjustable member is terminated, and means operable at will for causing simultaneous movement of said members.

In testimony whereof I affix my signature.

CORNELIUS G. BOUDETTE.